United States Patent
Basquin et al.

(10) Patent No.: US 10,035,474 B2
(45) Date of Patent: Jul. 31, 2018

(54) SHAPED PART, TRIM PART FOR VEHICLE INTERIORS, AND DEVICE AND PROCESS FOR PRODUCING THE SHAPED PART

(71) Applicant: Faurecia Innenraum Systeme GmbH, Hagenbach (DE)

(72) Inventors: Guillaume Basquin, Wissembourg (FR); Valentin Geoffroy, Havange (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 22 days.

(21) Appl. No.: 14/969,912

(22) Filed: Dec. 15, 2015

(65) Prior Publication Data

US 2016/0167596 A1  Jun. 16, 2016

(30) Foreign Application Priority Data

Dec. 15, 2014  (DE) .................. 10 2014 225 944

(51) Int. Cl.
| | | |
|---|---|---|
| *B60R 13/02* | (2006.01) | |
| *B29C 45/14* | (2006.01) | |
| *B29K 711/10* | (2006.01) | |
| *B29L 31/30* | (2006.01) | |
| *B29C 45/27* | (2006.01) | |
| *B29C 45/26* | (2006.01) | |

(52) U.S. Cl.
CPC .......... *B60R 13/02* (2013.01); *B29C 45/1418* (2013.01); *B29C 45/14786* (2013.01); *B29C 45/27* (2013.01); *B29C 2045/2683* (2013.01); *B29K 2623/12* (2013.01); *B29K 2711/10* (2013.01); *B29K 2713/02* (2013.01); *B29L 2031/3041* (2013.01)

(58) Field of Classification Search
CPC ............ B60R 13/02; B60R 2013/0293; B29C 45/1418; B29C 45/14786; B29C 45/27; B29C 2045/2683; B29K 2711/10; B29K 2623/12; B29K 2713/02; B29L 2031/3041
See application file for complete search history.

(56) References Cited

U.S. PATENT DOCUMENTS 5,297,842 A * 3/1994 Hayashi .................. B29C 51/12
156/260
8,291,593 B2  10/2012 Gutt et al.
(Continued)

FOREIGN PATENT DOCUMENTS

DE        4305847 C2    9/1993
DE   102005023945 A1   12/2006
(Continued)

*Primary Examiner* — D Glenn Dayoan
*Assistant Examiner* — Melissa A Black
(74) *Attorney, Agent, or Firm* — Reising Ethington P.C.

(57) ABSTRACT

A shaped part for a trim part for vehicle interiors with a support made of a mat that contains fibers. The support includes a recess on a visible side that extends in longitudinal direction, and a protrusion on a back side that extends in longitudinal direction and corresponds with the recess on the visible side. The shaped part includes a plastic layer positioned in the area of the recess that is formed from a material other than the mat and that is firmly bonded to the recess. A device for the production of the shaped part as well as a procedure for the production of the shaped part are provided.

16 Claims, 2 Drawing Sheets

(56) References Cited

U.S. PATENT DOCUMENTS

2008/0093830 A1\* 4/2008 Takezawa ............... B60R 13/02
                                                    280/751
2014/0084509 A1   3/2014 Hubauer et al.
2014/0167434 A1\* 6/2014 Galarza ................. B62D 65/14
                                                    296/1.08

FOREIGN PATENT DOCUMENTS

DE     102011005350 A1   9/2012
DE     102012022249 A1   2/2014
WO     WO2010105855 A2   9/2010

\* cited by examiner

SHAPED PART, TRIM PART FOR VEHICLE INTERIORS, AND DEVICE AND PROCESS FOR PRODUCING THE SHAPED PART

TECHNICAL FIELD

The invention relates to a shaped part for a trim part for vehicle interiors with a support made of a mat which contains fibers. Further the invention relates to a trim part for vehicle interiors with a shaped part, a device for the production of the shaped part as well as a procedure for the production of the shaped part.

BACKGROUND

Increasingly, interior trim parts in vehicle interiors are being made of natural fiber mats. The natural fiber mats are mostly pressed into shaped parts using compression molding. The thereby produced shaped parts exhibit, compared to shaped parts produced using injection molding, a comparatively low density respectively a low weight. In comparison to injection molding, the freedom of design is however geometrically restricted in natural fiber mats produced with compression molding. Natural fiber mats exhibit a certain stiffness, so that they may not be randomly shaped using compression molding. Accordingly, the shaped parts produced with compression molding may not exhibit randomly sharp edges. Furthermore, due to the material of the fiber mats, an implementation of fastening elements, such as reinforcing ribs, may be restricted.

The publication DE 10 2011 005 350 A1 discloses a device and a procedure for the production of a shaped part with a fiber-reinforced support to which at least one fixture is connected that exhibits plastic. The device is constructed to accommodate and compress a fiber-reinforced mat. Furthermore, the device exhibits a nozzle to inject liquefied plastic. The fixture is produced and integrated into the support by using the nozzle to inject the liquefied plastic through the fiber mat. In that injection process through the fiber mat however, the nozzle may get damaged or blocked.

In WO 2010/105855 a retaining profile is shown that exhibits a groove confined by side walls and floor to position a first and a second skin. The retaining profile is plugged into a recess of a support made from a natural fiber mat. In order to produce a support with an accurately positioned recess that is congruent to the measurements of the retaining profile, a retroactive handling of the support is necessary, for example by milling. In doing so, the production process requires additional steps.

SUMMARY

An object of the invention is to provide a comparatively simple shaped part for a trim part for vehicle interiors, as well as a procedure and a device for the production of the shaped part with which the mentioned disadvantages of the state of the art may be overcome.

This object may be achieved by a shaped part corresponding to claim 1, a device for the production of a shaped part corresponding to claim 7 as well as a procedure for the production of a shaped part corresponding to claim 11. Further designs and advantageous embodiments derive from the dependent claims and the design examples.

On this occasion it is to be mentioned that those features revealed in the context of the shaped part and those features relating to the procedure and the device for the production of the shaped part are also claimed for the procedure and the device to produce the shaped part itself.

In accordance with an aspect of the invention, there is provided a shaped part, such as a molded part, for a trim part for vehicle interiors with a support made of a mat which contains fibers. The support comprises a recess on a visible side that extends in a longitudinal direction, and a protrusion on the back side that extends in a longitudinal direction and corresponds with the recess on the visible side. In the area of the recess a plastic layer is positioned that includes a material other than the mat and which is firmly bonded to the recess.

Due to the mat which contains fibers the support has a comparatively low weight. Further the geometric design freedom regarding the shaped part may be expanded due to the plastic layer. For example, by applying a plastic layer on the visible side of the support a form may be designed which would not be producible from a support made only of a mat which contains fibers. Because of the firmly bonded connection of plastic layer and support, the plastic layer and the support are tightly connected with each other.

The support is typically produced by compression molding of the fiber mat. In that process a thickness of the mat is reduced by compression molding until the desired thickness of the support is achieved. The thickness of the support may hereby vary. The thickness of the support which is formed with the help of compression molding may for example measure between 0.8 mm and 5 mm. The thickness of the support may be smaller than 5 mm, 4 mm, or 3 mm. Further the thickness of the support may be bigger than 0.8 mm, 1 mm, or 2 mm. For example, during production, the mat may be compressed less in the area of the recess than in the area outside of the recess. A medium thickness of the support may therefore be bigger in the area of the recess than outside of the recess. For example, a medium thickness of the support in the area of the recess is 20% or 40% or 60% higher than the medium thickness of the support outside of the recess.

Due to the fact that reduced pressure is applied in the area of the recess during compression molding, the surface of the fiber mat in the area of the recess may be more porous. After compression molding of the mat a plastic melt may be applied into the recess. The plastic melt may then penetrate the open pores of the fiber mat and firmly bond with the fiber mat. In that process the plastic layer in the completed shaped part is firmly connected with the support. The support may therefore in some areas be impregnated with the plastic layer.

In a further design the plastic layer on the visible side forms a groove which exhibits a rectangular or stair shaped or trapezoidal form in its transverse section. Here, a longitudinal direction of the groove proceeds essentially parallel to the recess. However, a shape of the groove in a transverse section vertical to the longitudinal direction typically differs from the shape of the recess. Because of the plastic layer the support may exhibit geometric forms in the area of the recess which would not have been producible with a fiber mat formed with the help compression molding.

In a transverse section vertical to the mentioned longitudinal direction the recess of the support exhibits for example a smallest radius of curvature. Further, in a transverse section vertical to the mentioned longitudinal direction the plastic layer exhibits a smallest radius of curvature. The smallest radius of curvature of the plastic layer is typically disposed on the side of the plastic layer facing away from the support. In the case of a rectangular, stair shaped or trapezoidal groove, the smallest radius of curvature of the plastic layer is typically disposed along the edges of the groove or along the edges of the stairs. The smallest radius of curvature of the plastic layer is preferably at least 20% or at least 40% or at least 60% smaller than the smallest radius of curvature of the recess of the support. The smallest radius of curvature of the recess of the support may for example measure at least 0.5 mm or at least 0.8 mm or at least 1 mm. Furthermore the smallest radius of curvature of the plastic layer may measure at the most 0.4 mm or at the most 0.3 or at the most 0.2 mm or at the most 0.1 mm. The plastic layer may cover the visible side of the support only partially. For example, the plastic layer may cover less than 50%, less than 10%, or less than 5% of the visible side of the support. Usually the plastic layer is only positioned in the area of the recess. Depending on the embodiment at least 50%, preferably at least 70%, particularly at least 90% of the recess may be coated with the plastic layer. Here, also the whole recess may be coated with the plastic layer.

Typically, the plastic layer exhibits a variable thickness. The thickness of the plastic layer in the embodiment measures at least 0.2 mm. In a further embodiment the thickness of the plastic layer measures at the most 2 mm or at the most 1 mm. Particularly, the thickness of the plastic layer may be smaller than the thickness of the support.

In a further design the recess exhibits a width and/or a depth of at least 1 mm each. The mentioned width and/or the mentioned depth may measure at the most 10 mm. A length of the recess extends itself for example across a total length of the shaped part and depending on the dimensions of the shaped part may measure for example at least 10 cm.

In a further embodiment a plastic fixture, e.g., a rib, is positioned on the back side of the support. The fixture may comprise the same material as the plastic layer and may be firmly bonded to the back side of the support. Preferably the fixture and the plastic layer may be produced in one manufacturing step. The fixture may for example be a fastening element or a reinforcement structure, particularly a reinforcing rib. Analogously to the above mentioned thickness of the support in the area of the recess, the thickness of the support in the area of the fixture may be bigger than in an area outside of the recess and outside of the fixture. As described above, a surface of the support which is connected with the fixture is as a rule more porous than the area of the support outside the recess as well as outside the fixture. During production of the support with the fixture the plastic melt penetrates the open pores. Hereby a mechanical bonding of the plastic with the fiber mat is formed, so that a firm connection between support and fixture and/or the plastic layer may be produced. The connection between the support and the fixture and/or the plastic layer may also be positive-locking and/or firmly bonded, whereby the firm bond results from the chemical connection of the fiber mat with the plastic of the fixture and/or the plastic layer.

The mat typically contains natural fibers, glass fibers, mineral fibers, carbon fibers, synthetic fibers, or cellulose fibers. The mat may also comprise a combination of the above mentioned fibers. The fiber content of the mat typically amounts to between 30 weight percent and 100 weight percent, especially preferred being 40 weight percent to 90 weight percent. The remaining percentage share is typically formed by filling materials, such as granulates or synthetic fibers as well as melt fibers. In an embodiment the mat consists of a mixture of natural fiber and plastic, such as natural fiber polypropylene (NFPP). Wood, hemp, flax, coconut, or sisal fibers or mixtures of theses natural fibers are particularly used as natural fibers. A thermoplastic, an elastomer or a thermoplastic elastomer, may be used as material for the plastic layer and/or the fixture. Polyurethane (PU), polypropylene (PP), polyethylene (PE), acrylonitrile butadiene styrene (ABS) or a mixtures of these plastics are mentioned here as examples.

Furthermore, a trim part for vehicle interiors with a shaped part of the previously described kind is provided. In the case of the trim part for vehicle interiors a first decorative skin and a second decorative skin may be positioned on the visible side of the support. The mentioned decorative skins typically comprise leather or artificial leather. A retaining profile with a second groove which is delimited by sidewalls and floor and extends in longitudinal direction is positioned in the first groove of the plastic layer. An end section of the first decorative skin and an end section of the second decorative skin are inserted in the second groove of the retaining profile. The end sections of the decorative skins may be connected with each other by means of a function stitching. Preferably the decorative skins are connected to the retaining profile by means of further stitchings. With the help of the mentioned retaining profile the decorative skins may be mounted onto the support especially quickly and reliably. By means of the first groove which is formed in the plastic layer the retaining profile may be attached to the support with sufficient precision. The decorative skins may contact the support directly in regions of the trim part. For example, an area of the regions in which the decorative skins may contact the support directly may amount to at least 25%, at least 50%, or at least 75% of the total area of the visible side of the support.

With the existing application, there is also provided a device for the production of a shaped part with a support comprising a mat which is formed with the help of compression molding and contains fibers, whereby the support exhibits a recess on the visible side and a protrusion on the back side which corresponds with the recess, and whereby a plastic layer which is firmly bonded to the support is positioned in the area of the recess of the support.

The device comprises a first tool component that exhibits a positive form with a protrusion which proceeds in a longitudinal direction, a second tool component that exhibits a negative form with a recess which corresponds with the protrusion, and at least a first nozzle to feed plastic melt, whereby the nozzle is located in the protrusion of the positive form. Furthermore, at least one second nozzle to feed plastic melt is provided for. This second nozzle is configured as part of the second tool component. Of the tool components at least one tool component is moveable relative to the other tool component. The tool components are designed in such a way that they receive the mat when open and compress the mat when closed. In addition the tool components are designed in such a way that, when closed, a first cavity that extends in longitudinal direction of the protrusion of the positive form is developed between the protrusion and the mat which is accommodated between the tool components and a second cavity is developed between the second tool component and the mat. In order to develop the plastic layer on the visible side of the support, the plastic melt may be applied into the first cavity by means of the nozzle.

The mentioned device for the production of the shaped part may particularly be used simultaneously as device for compression molding and as a unit for injection molding.

The first and/or the second nozzle may also be additionally movable in closing direction of the tool components, so that the positioning and/or the shaping of the fiber mat into the recess are improved.

In a transverse section vertical to the longitudinal direction the protrusion of the positive form may be formed rectangular, stair shaped, or trapezoidal so that a corresponding rectangular or stair shaped or trapezoidal groove forms on the visible side of the plastic layer. Because a plastic melt is inserted into the cavity, the plastic melt may, on the contrary to a relatively stiff fiber mat, take nearly every complementary form of the positive form respectively of the protrusion of the positive form. The protrusion may exhibit a width and/or a depth of at least 1 mm each and/or at the most 10 mm each. The length of the protrusion measures at least 10 cm.

In one embodiment the tool components are formed in a way that a medium pressure exerted on the mat during compression molding is lower in the area between the protrusion of the positive form and the recess of the negative form than outside of this area. Because of this, during compression molding the mat is less compressed in the area between the protrusion and the recess of the negative form than outside of this area.

The protrusion of the positive form may exhibit a smallest radius of curvature of at the most 0.4 mm, or at the most 0.3 mm or at the most 0.2 mm, or at the most 0.1 mm. The protrusion of the positive form may therefore exhibit particularly sharp edges.

An injection unit is positioned in at least one of the two tool components and connected with the nozzle which is located in the respective tool component. The nozzle located in the respective other tool component is connected with the injection unit for example with the help of a joint between the first tool component and the second tool component. In one embodiment, the first nozzle and/or the second nozzle are configured as hot runner nozzle. The first nozzle and/or the second nozzle may be connected to the injection unit by means of hot runners. The mentioned joint may be formed as a valve which only opens when the device is closed and is closed when the device is opened. This ensures that the plastic melt enters only when the device is closed. Thereby it is prevented that the plastic gushes or oozes from the joint while the device is open.

The first tool component and/or the second tool component may exhibit means for tempering. For example one or both tool components may be tempered to a temperature between 40° C. and 100° C., for example to more or less 50° C.

The injection unit may be configured to provide an injection pressure of for example at least 300 bar whereby the mat may be compressed by means of the injection pressure of the plastic. The injection pressure may for example lie in the range of 300 to 500 bar. Further a closing pressure of the device for the production of the shaped part may amount to at least 100 t and may range up to 1000 t.

The device is particularly designed for the production of the shaped part or the trim part for vehicle interiors according to the way described above.

In accordance with another aspect of the invention, there is provided a process for the production of the shaped part. The process comprises of the following steps:

a. insertion of a mat which contains fibers between a first tool component and a second component tool of a device,
b. compression molding of the mat due to closing the device in such a way that a recess is formed on the visible side of the mat which extends in longitudinal direction and a protrusion is formed on the back side of the mat which corresponds with the recess,
c. while the device is closed, forming of a first cavity between the recess of the mat and the first tool component and forming of a second cavity between the back side of the mat and the second tool component,
d. while the device is closed, injection of a plastic melt into the first and the second cavity by means of a nozzle located in the respective tool component,
e. firmly bonding the plastic melt to the recess of the mat, and
f. forming of the shaped part with a support comprising a mat which contains fibers, and a plastic layer which is positioned in the recess of the support, and a fixture located on the back side of the support.

In one embodiment, prior to compression molding the fiber mat is preheated to a temperature of at least 100° C. and/or up to 300° C.

Prior to compression molding the mat may exhibit an average thickness of 0.8 cm to 1.5 cm, for example about 1 cm. The support formed by compression/compression molding of the mat may have a thickness of 1 to 2 mm.

The compression molding of the fiber mat according to steps a) and b) is also called "calibration". In one embodiment, prior to calibration the fiber mat is heated to 100 to 300° C., for example to 150 to 250° C., preferably 180 to 220° C. and pre-calibrated under pressure, for example to a thickness of about 3 mm. The hot and still unformed mat may subsequently be inserted into the device for production of the shaped part, and may be shaped to form under very high pressure. Thereby, the mat may cool down slightly and be compressed to a final thickness of 1 to 2 mm. The device may be tempered to a temperature which is lower than the temperature of the fiber mat. For example, the device is tempered to around 50° C.

Usually, the steps of compression molding and injection take place in succession. The injection of the plastic (the injection molding material) occurs for example at least 2 s, 5 s, 8 s, or 10 s after compression molding. The plastic melt may be injected under an injection pressure of at least 300 bar and/or at the most 500 bar into the first and/or the second cavity. The plastic melt may be inserted with an injection pressure high enough to at least partially compress the mat in the area of the recess. Therefore, the mat in the area of the recess is not only compressed by the pressure of the tool components but is additionally, at least partially compressed by the injection pressure.

The plastic melt may be for example liquefied plastic, liquid plastic, or pasty plastic.

In one embodiment, due to the injection of the plastic melt a groove is formed on the visible side of the plastic layer which exhibits, in a transverse section to the longitudinal direction, a rectangular or stair shaped or trapezoidal shape and which proceeds essentially parallel to the recess of the support. Because the groove is produced by injection molding the fiber material can be pressed against the tool component opposite to the nozzle. With the suggested procedure therefore a groove shape may be provided which shows significantly less variations compared to other procedures by which the groove is mounted or inserted.

In one embodiment, a compression molding pressure is exercised on the mat during compression molding which is smaller in the area of the first cavity and/or the second cavity between the mat and the respective tool component than outside of that area. As a result, the support made of the shaped mat in the area of the recess is in the medium thicker than outside of that area.

In a further design the injection into the first cavity and the injection into the second cavity take place in a parallel manner or at least in a partially parallel manner. It may for example be earmarked that the first nozzle and the second nozzle are connected to a single injection unit. The injection unit may insert plastic melt simultaneously into the first nozzle and the second nozzle. Hereby the fixture and the plastic layer may be splashed on to the support in a single step (one shot process).

The procedure is particularly developed for the production of the shaped part described above, or of the above described trim part for vehicle interiors. Furthermore, the procedure is carried out particularly by means of the above described device.

BRIEF DESCRIPTION OF THE DRAWINGS

Examples of embodiments of the invention are explained by means of accompanying figures.

The figures show.

DETAILED DESCRIPTION

Figure 1:
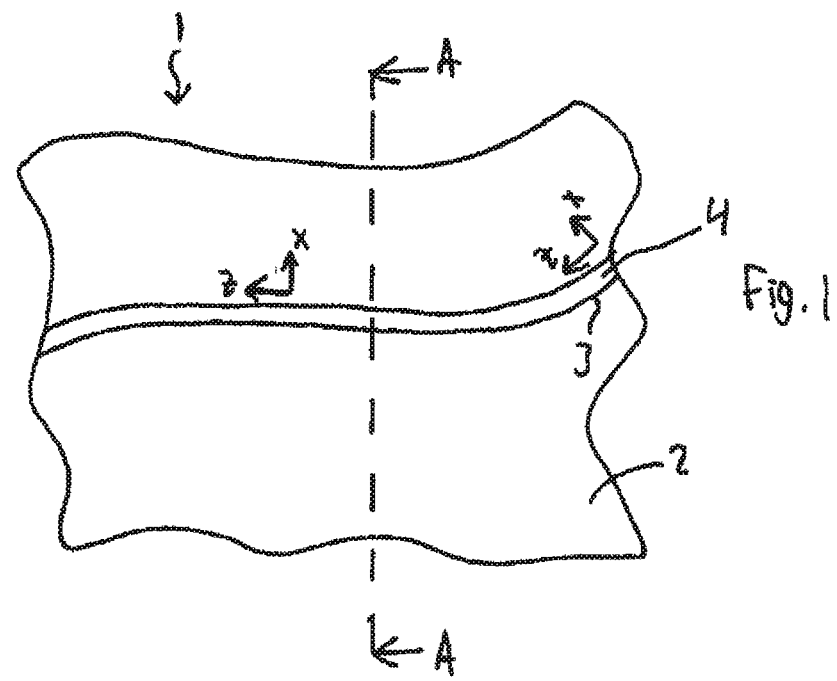
FIG. 1: a top view of the visible side of a molded part.

FIG. 1 shows the visible side of a molded part 1 for a trim part for vehicle interiors. The molded part 1 may be installed for example in a center console, in a dashboard, in a door, or elsewhere in a vehicle interior of a motor-vehicle. The molded part 1 includes a support 2 having a recess 3 that extends in a longitudinal direction (z-direction). In the area of the recess 3 a plastic layer 4 is positioned that is firmly bonded to the recess 3 of the support 2. The support 2 is produced from a mat 10 which contains fibers that is shaped into support 2 by a procedure of compression molding. The fiber mat 10 comprises of a natural fiber polypropylene fleece (NFPP). Here, renewable raw materials, such as flax and sisal constitute the natural fiber. Further the support exhibits a protrusion 5 on a back side 8 that extends in longitudinal direction (z-direction) and that corresponds with the recess 3 on the visible side 7.

Figure 2:
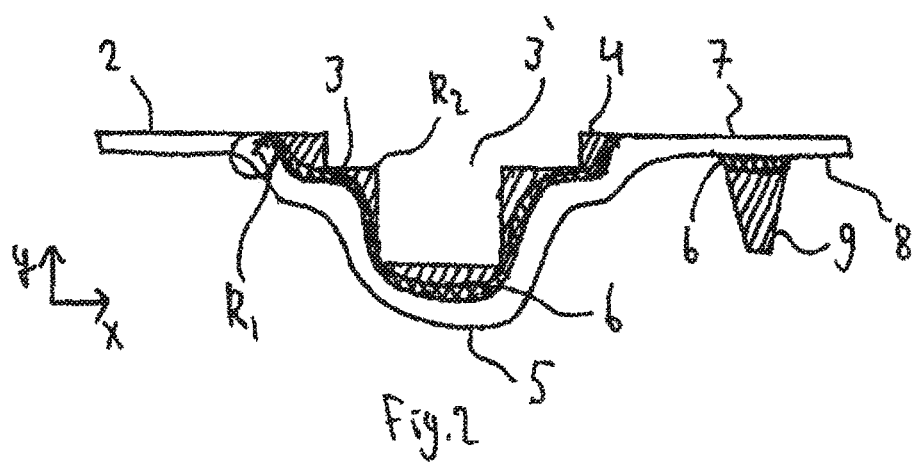
FIG. 2: a cut through the molded part according to FIG. 1.

In FIG. 2 a transverse section along the cutting line A of FIG. 1 is shown. The plastic layer 4 constitutes a T-shaped groove 3' on the visible side 7 of the molded part 1. A longitudinal direction of this groove 3' proceeds essentially parallel to the recess 3. In FIG. 2 a transitional layer 6 is recognizable that comprises of both fibers and plastic. In the area of this layer 6 the support 2 is impregnated with the plastic of the plastic layer 4. In the area of the recess a medium thickness of the support 2 is greater than outside of that area. Here, in order to determine the medium thickness of the support, the transitional layer 6 made of fibers and plastic is taken into consideration.

Figure 3:
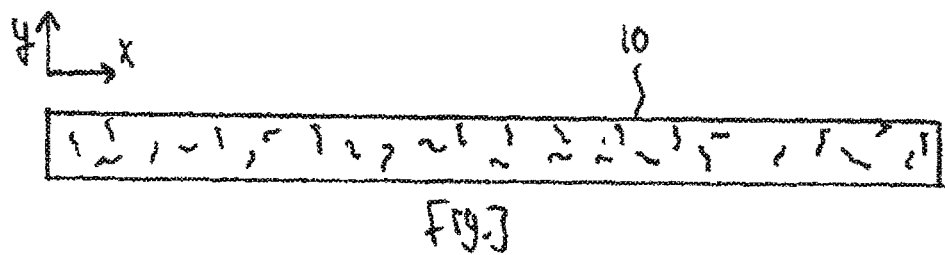
FIG. 3: a mat which contains fibers.

In FIG. 3 a transverse section of a mat 10 which contains fibers is shown that is used for the production of the support 2. The fiber mat 10 is reshaped into the support 2 in a procedure of compression molding. The not yet formed fiber mat 10 exhibits essentially a constant thickness of approximately 1 cm. It may however exhibit a variable thickness even before compression molding.

Figure 4:
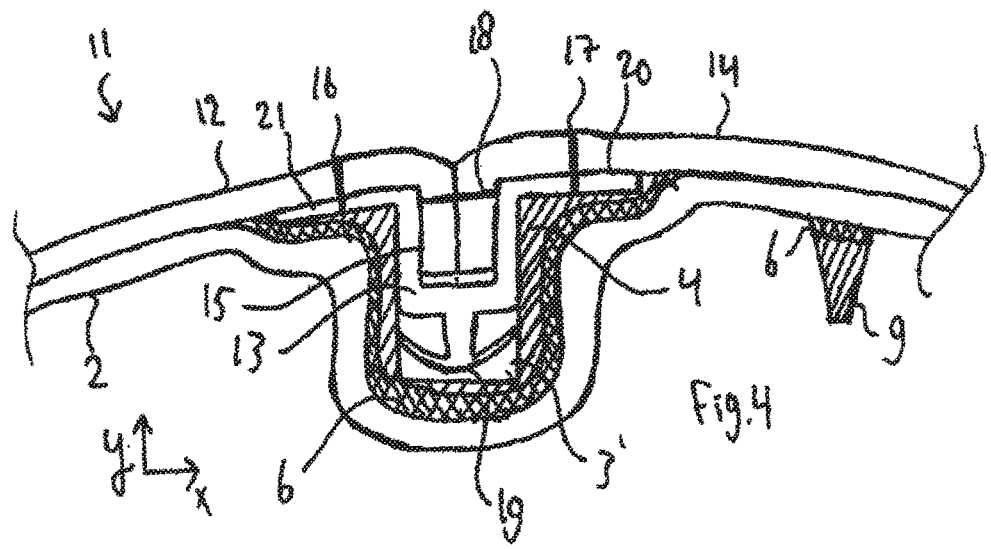
FIG. 4: a cut through a trim part for vehicle interiors with a molded part according to FIGS. 1 and 2, and FIG. 5: a device for the production of a molded part according to FIGS. 1 and 2.

In FIG. 4 a trim part for vehicle interiors 11 with the molded part 1 from FIGS. 1 and 2 is shown. A retaining profile 13 is plugged into groove 3' which is formed by the plastic layer 4 and the support 2. The retaining profile 13 consists of a plastic profile which is extruded in one piece and exhibits side walls and a floor, whereby the side walls and the floor delimit a second groove 15 which is formed in order to position a first decorative skin 12 and a second decorative skin 14. The first and the second decorative skins 12 and 14 are made from leather and connected to the retaining profile 13 by means of stitching 16 and 17. Furthermore the decorative skins 12 and 14 are connected with each other by means of a function stitching 18. The retaining profile 13 exhibits a pin 19 with an anchor which is wedged into the groove 3'. By means of plastic layer 4 the retaining profile 13 may be positioned precisely onto the support 2, whereby the visually appealing appearance of the trim part for vehicle interiors is ensured. In a preferred embodiment the whole recess 3 is coated with the plastic layer 4. It may also be planned that at least 50%, preferably at least 70%, or at least 90% of the recess is coated with the plastic layer 4. The retaining profile 13 is flexible or bendable and therefore adapts to the course of the longitudinal direction of the groove 3' of the plastic layer 4 respectively the recess 3 of the support 2. Furthermore the retaining profile 13 is being laid out on the plastic layer 4 by means of two wings 20, 21, whereby the wings 20,21 allow a precise positioning of the retaining profile 13 and also function as spacers and position retainers. Further details of the mentioned retaining profile 13 are available, for example in the publication WO 2010/105855 A2.

Figure 5:
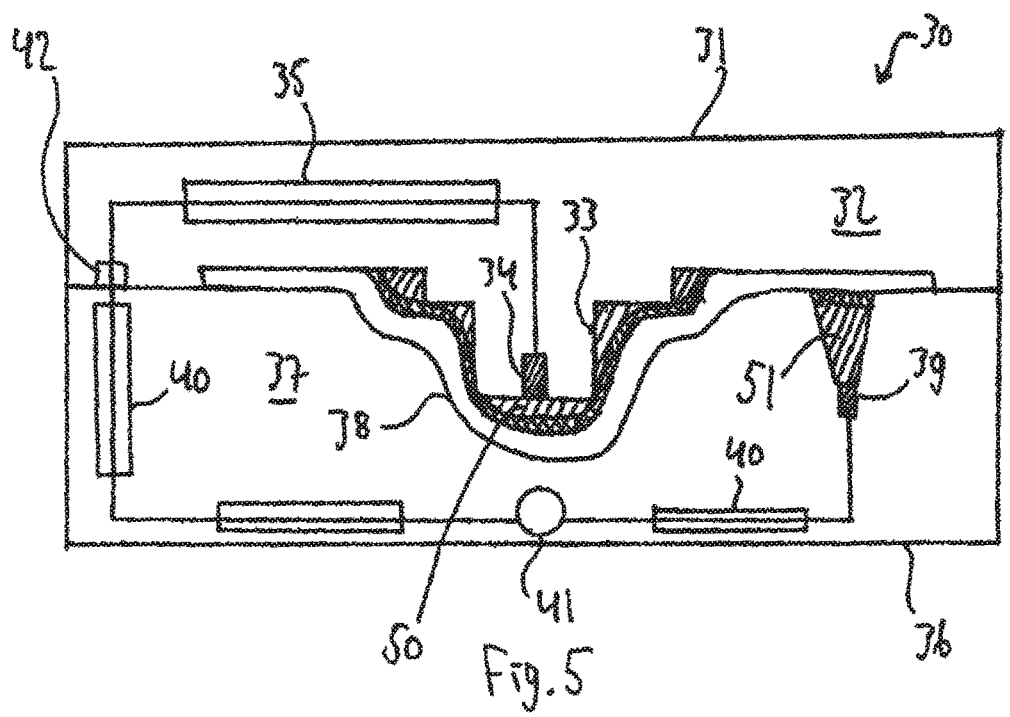

FIG. 5 shows a transverse section of a device 30 for the production of a molded part 1 according to FIGS. 1 and 2. The device 30 is developed as both device for compression molding and unit for injection molding.

The device 30 comprises of a first tool component 31 that exhibits a positive form 32 with a protrusion 33 which proceeds in longitudinal direction. A first nozzle 34 to feed plastic melt is located in protrusion 33. The nozzle 34 is further connected to a hot runner 35. Furthermore the device 30 comprises of a second tool component 36 which exhibits a negative form 37 with an indentation 38 which corresponds with the protrusion 33. A second nozzle 39 to feed liquefied plastic is planned for the second tool component. Furthermore, an injection unit 41 is provided for inside the second tool component 36 which is connected to the second nozzle 39 respectively the first nozzle 34 by the hot runners 40 and 35. The first nozzle 34 of the first tool component 31 is connected to the injection unit 41 by a joint 42 between the first tool component 31 and the second tool component 36. The first tool component 31 is moveable in relation to the other tool component 36. Further the tool components 31 and 36 are configured so that when opened the mat 10 may be included and when closed the fiber mat may be shaped by compression molding. In FIG. 5 the closed state is shown.

Due to its rigidity the fiber mat 10 cannot take any random possible form predetermined by the positive and negative form 32, 37. If accordingly the fiber mat 10 which is displayed in FIG. 3 is accommodated by the tool components 31 and 36, a medium pressure exercised on the mat during compression molding is not homogenously distributed across the x-direction. In those areas in which a higher pressure is pending the fiber mat 10 is thus compressed to a greater extent than in areas in which a lower pressure is exerted. Particularly a pressure exerted on the mat 10 in the area between the protrusion 33 of the positive form 32 and the indentation 38 of the negative form is in the medium lesser than a pressure exerted outside of that area.

When device 30 is closed a cavity 50 which extends in longitudinal direction of the protrusion 33 of the positive form 32 is formed between the protrusion and the mat which is accommodated between the tool components 31 and 36. The nozzle 34 is directly linked to cavity 50, whereby liquid or liquefied plastic from the nozzle 34 may be inserted into the cavity to form the plastic layer 4 on the visible side 7 of the mat 10. Due to the lower pressure in the area of the recess 3, the fibers of the fiber mat 10 are less tightly compressed than in an area outside of the recess.

Thus the liquid plastic (plastic melt) coming out of the nozzle can spread through a relatively porous formation along the recess 3 of the mat 10. Hereby a tight connection develops between the plastic layer 4 and the subsequent support 2. In the shown example of embodiment the protrusion 33 of the positive form 32 is, in a transverse section vertical to the longitudinal direction, developed in stair shaped form to form a stair shaped or t-shaped profile of groove 3' on the visible side 7 of the plastic layer 4. The protrusion 33 of the positive form 32 exhibits a smallest radius of curvature of at the most 0.3 mm, and thus corresponds to a smallest radius of curvature of the plastic layer 4 on the visible side 7. As opposed to the mat 10 which features a certain rigidity, the plastic sprayed through the nozzle 34 may take almost any random form. The t-shaped groove which is formed by the plastic layer is produced with a precision that is necessary to correctly position the retaining profile 13. Instead of the joint 42 there may be an injection unit 41 provided for each of the tool components 31, 36. By means of the nozzle 39 a second cavity 51 which is developed in the negative form 37 may be likewise filled with liquefied plastic. Thereby, a fixture 9 which is developed as a reinforcing structure or reinforcing rib, is integrally formed onto the support 2. In the described embodiment the injection into the first and the second cavity occurs simultaneously, whereby a duration of production for the molded part 1 or the trim part for vehicle interiors 11 may be shortened.

In the following a procedure is described with which the molded part 1 can be produced by means of the device 30.

The fiber mat of approximately 1 cm thickness is preheated to a temperature between 100° C. and 300° C., for example, to 200° C. Preheating may take place outside of the device 30. Yet, it may also be earmarked that a heating device which is not depicted is provided for the device 30 for heating the fiber mat 10 inside the device 30. The preheated fiber mat 10 may be firstly compressed to a thickness of about 3 mm (calibration of the fiber mat 10). The calibration may be performed inside the device 30 but it may also take place inside of an additional calibration device.

The hot fiber mat 10 is inserted between the first tool component 31 and the second tool component 36. Thereupon, the first tool component 31 is moved in the direction of the second tool component 36 until the tool components 31 and 36 reach a closed condition. Upon closing of the two tool components 31 and 36 the preheated mat 10 is compressed to about 1 to 2 mm, whereby a longitudinally extending recess 3 is formed on the visible side 7 of the mat 10 and also a protrusion 5 is formed on the back side 8 which corresponds to the recess 3. The tool moieties are tempered (cooled) by means of a tempering device (not shown) to around 50° C. For this reason, the mat 10 cools down inside the device 30.

When in closed condition a cavity 50 is formed between the visible side 7 of the mat 10 and the first tool component 31 due to the shape of the protrusion as well as the shape of the indentation 38. In addition, a second cavity 51 is formed between the back side 8 of the mat 10 and the second tool component 36. Approximately 8 s after compression molding liquid plastic is injected into the first cavity 50 respectively the second cavity 51 under a pressure of 300 to 500 bar by means of the first nozzle 34 and the second nozzle 39 which are both connected to the injection unit 41. The plastic melt spreads in the first and second cavity 50 and 51 and impregnates the mat 10, partially on the visible side 7 and on the back side in the area of the cavities 50 and 51. Subsequently or simultaneously the tool components 31 and 36 are cooled, whereby firstly, the support 2 is formed from the fiber mat 10 and, secondly, the plastic hardens and firmly bonds with the recess of the mat. Thereafter, by moving the upper tool component 31 the device 30 may be opened and the molded part may be removed.

The first nozzle 34 may also be additionally movable towards the closing direction of the tool components, so that the positioning/shaping of the fiber mat 10 into the indentation 38 is improved.

Due to the selected shape of the protrusion 33 and the indentation 38 during compression molding a pressure is exerted on the mat 10 that on average has a lesser extent in the area of the recess of the mat 10 than outside of that area. Simultaneously or nearly simultaneously with the step of injecting the plastic melt into the cavity 50, plastic is sprayed into the cavity 51 by means of the second nozzle 39 on the back side 8 of the mat 10 to form a reinforcing rib 9. The steps of compression molding and injection molding hence take place inside the same device 30.

In the figures, recurring features are marked with the same reference signs. Those features merely revealed in the figures may be claimed individually or combined with other features.

The invention claimed is:

1. Shaped part for a trim part for vehicle interiors, comprising:
   a support that includes a mat which contains fibers, the support comprising:
      a recess on a visible side which extends in a longitudinal direction, and
      a protrusion on a back side which extends in the longitudinal direction and which corresponds with the recess on the visible side; and
   a plastic layer that is positioned in the area of the recess, wherein the plastic layer comprises a material other than the mat and is bonded to the support in the recess, wherein the support is impregnated with the material of the plastic layer at least in some areas of the recess.

2. Shaped part according to claim 1, wherein the plastic layer on the visible side forms a groove which in a transverse section exhibits a rectangular or stair shaped or trapezoidal form, wherein a longitudinal direction of the groove proceeds essentially parallel to the recess.

3. Shaped part according to claim 1, wherein in a transverse section vertical to the longitudinal direction the recess of the support exhibits a minimum radius of curvature (R1), and in a transverse section vertical to the longitudinal direction the plastic layer has a minimum radius of curvature (R2), wherein the minimum radius of curvature of the plastic layer (R2) is smaller by at least 20% compared to the minimum radius of curvature (R1) of the recess of the support.

4. Shaped part according to claim 3, wherein the minimum radius of curvature (R1) of the recess of the support is at least 0.5 mm and/or the minimum radius of curvature (R2) of the plastic layer is at most 0.4 mm.

5. Shaped part according to claim 1, wherein a plastic fixture is positioned on the back side of the support which comprises the same material as the plastic layer and is firmly bonded with the back side of the support.

6. Trim part for vehicle interiors with a shaped part according to claim 2, wherein a first decorative skin and a second decorative skin are positioned on the visible side of the support, wherein a retaining profile with a second groove delimited by side walls and a floor and extending in the longitudinal direction is positioned in the groove of the plastic layer, and wherein an end section of the first decorative skin and an end section of the second decorative skin are received in the second groove of the retaining profile.

7. Device for the production of a shaped part that has a support and plastic layer, the support comprising a mat which is shaped by compression molding and which contains fibers, wherein the support includes a recess on a visible side and a protrusion on a back side that corresponds to the recess, and wherein the plastic layer is positioned in the area of the recess of the support and is bonded to the support, the device comprising:
    a first tool component exhibiting a positive form with a protrusion which proceeds in a longitudinal direction,
    a second tool component exhibiting a negative form with a recess that corresponds to the protrusion, and
    at least one first nozzle for feeding a plastic melt, wherein the first nozzle is located in the recess of the positive form,
    at least one second nozzle for feeding a plastic melt, wherein the second nozzle is located in the second tool component;
    wherein at least one of the tool components is movable relative to another of the tool components, and the tool components when open accommodate the mat and when closed shape the mat by compression molding;
    wherein the tool components are configured such that a first cavity which extends in the longitudinal direction of the protrusion of the positive form is developed between the protrusion and the mat which is accommodated between the tool components, and a second cavity is developed between the second tool component and the mat, wherein plastic may be inserted through the first nozzle into the first cavity in order to form the plastic layer on the visible side of the support and plastic may be inserted through the second nozzle into the second cavity in order to form a fixture on the back side of the support.

8. Device according to claim 7, wherein in a transverse section vertical to the longitudinal direction, the protrusion of the positive form is developed in a rectangular or stair shaped or trapezoidal form in order to form a groove of rectangular or stair shaped or trapezoidal form on the visible side of the plastic layer.

9. Device according to claim 7, wherein the protrusion of the positive form has a smallest radius of curvature of at most 0.4 mm.

10. Device according to claim 7, wherein an injection unit is positioned in one of the two tool components, with the injection unit being connected to the nozzle situated inside the one tool component, and wherein the nozzle situated inside the respective other tool component is connected to the injection unit by a joint which is located between the first tool component and the second tool component.

11. A method for producing a shaped part, comprising the steps of:
    a. inserting a mat which contains fibers between a first tool component and a second tool component of a device;
    b. compression molding the mat by closing the device in a way that a recess which extends in a longitudinal direction is formed on a visible side of the mat and a protrusion is formed on a back side of the mat which corresponds with the recess;
    c. while the device is closed, forming of a first cavity between the recess of the mat and the first tool component and forming of a second cavity between the back side of the mat and the second tool component;
    d. while the device is closed, injecting a plastic melt into the first cavity and into the second cavity by means of a nozzle situated inside the respective tool components;
    e. bonding the plastic melt with the recess of the mat; and
    f. forming the shaped part with a support comprising the mat which contains fibers, a plastic layer which is positioned in the recess of the support, and a fixture located on the back side of the support.

12. The method set forth in claim 11, wherein the plastic melt is injected into the cavity with an injection pressure of at least 300 bar and/or at most 500 bar.

13. The method set forth in claim 11, wherein due to the injection of the plastic melt a groove is formed on the visible side of the plastic layer which exhibits, in a transverse section to the longitudinal direction, a rectangular or stair shaped or trapezoidal shape and which proceeds essentially parallel to the recess of the support.

14. The method set forth in claim 11, whereby a NFPP fiber fleece is used which is prior to step a) pre-calibrated under pressure at 180° C. to 220° C.

15. The method set forth in claim 11, wherein the injection into the first cavity and the injection into the second cavity are carried out at or nearly at the same time.

16. Shaped part for a trim part for vehicle interiors, comprising:
    a support that is made of a fiber mat, the support comprising:
        a recess on a visible side which extends in a longitudinal direction, and
        a protrusion on a back side which extends in the longitudinal direction and which corresponds with the recess on the visible side; and
    a plastic layer that is positioned in the area of the recess, wherein the plastic layer comprises a material other than the mat and is bonded to the support in the recess, wherein the support is impregnated with the material of the plastic layer at least in some areas of the recess.

* * * * *